United States Patent
Maria

(10) Patent No.: US 9,210,110 B2
(45) Date of Patent: Dec. 8, 2015

(54) PREDICTIVE MESSAGING SERVICE FOR ACTIVE VOICE CALLS

(75) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/596,412

(22) Filed: Aug. 28, 2012

(65) Prior Publication Data

US 2014/0066025 A1 Mar. 6, 2014

(51) Int. Cl.
*H04L 12/58* (2006.01)

(52) U.S. Cl.
CPC .............. *H04L 51/066* (2013.01); *H04L 51/38* (2013.01)

(58) Field of Classification Search
CPC .. G06Q 30/02; G06Q 30/0247; H04W 4/028; H04W 4/00; H04L 67/2823; H04L 51/066; H04L 51/38
USPC ....................................................... 455/414.4
See application file for complete search history.

(56) References Cited

U.S. PATENT DOCUMENTS

| | | | |
|---|---|---|---|
| 6,606,373 B1 | 8/2003 | Martin | |
| 6,980,953 B1 * | 12/2005 | Kanevsky et al. | ............ 704/235 |
| 7,065,185 B1 | 6/2006 | Koch | |
| 7,412,040 B2 | 8/2008 | Koch | |
| 7,826,601 B2 | 11/2010 | Koch | |
| 7,979,279 B1 | 7/2011 | McKinney | |
| 8,326,643 B1 * | 12/2012 | Eshkenazi et al. | ............. 705/1.1 |
| 8,447,285 B1 * | 5/2013 | Bladon et al. | ............. 455/414.1 |
| 8,606,576 B1 * | 12/2013 | Barr et al. | ..................... 704/235 |
| 2004/0042591 A1 | 3/2004 | Geppert et al. | |
| 2004/0267527 A1 | 12/2004 | Creamer et al. | |
| 2006/0285657 A1 * | 12/2006 | Lippke et al. | ................ 379/67.1 |
| 2009/0003540 A1 | 1/2009 | Zafar | |
| 2009/0106695 A1 * | 4/2009 | Perry et al. | ..................... 715/816 |
| 2009/0232288 A1 * | 9/2009 | Forbes et al. | ............. 379/93.23 |
| 2009/0299743 A1 * | 12/2009 | Rogers | ........................... 704/235 |
| 2010/0121629 A1 | 5/2010 | Cohen | |
| 2011/0125498 A1 | 5/2011 | Pickering et al. | |
| 2012/0004978 A1 * | 1/2012 | Kothari et al. | ............. 705/14.42 |
| 2012/0290508 A1 * | 11/2012 | Bist | ................................ 706/10 |
| 2013/0300666 A1 * | 11/2013 | Archer et al. | ................. 345/168 |

OTHER PUBLICATIONS

"VoiceCloud Real-Time Voice-to-Text Transcription Service Launched" [http://www.ecoustics.com/electronics/products/new/468518.html] Apr. 2, 2008.

* cited by examiner

*Primary Examiner* — Liton Miah
(74) *Attorney, Agent, or Firm* — Hartman & Citrin LLC

(57) ABSTRACT

Concepts and technologies disclosed herein are for a predictive messaging service for active voice calls. A method for predictive messaging may include receiving, at a predictive messaging system, incoming audio associated with an active voice call, converting the audio into text, analyzing the text to predict a message that a user participating in the active voice call is expected to send, creating the message, and sending the message to a network element for delivery to a destination.

20 Claims, 8 Drawing Sheets

PREDICTIVE MESSAGING SERVICE FOR ACTIVE VOICE CALLS

TECHNICAL FIELD

The concepts and technologies disclosed herein generally relate to communication services. More specifically, the concepts and technologies disclosed herein relate to a predictive messaging service for active voice calls.

BACKGROUND

Text messaging is a ubiquitous communication service used to exchange messages between compatible mobile communications devices. One technology used to exchange such messages is called Short Message Service ("SMS"). SMS messages are limited to 160 characters, but multiple SMS messages may be combined to create messages that include more than 160 characters. SMS relies upon control channels of voice networks, such as Global System for Mobile communications ("GSM") and Universal Mobile Telecommunications System ("UMTS"), to transmit SMS messages to and from compatible mobile communications devices. As an alternative to SMS, IP messages may be exchanged over a data network. Other text-based communication services such as instant messaging, email, and social network messaging are commonly used to exchange text-based information.

Voicemail is another ubiquitous communication service. Voicemail services allow a calling party to leave a voicemail message if a called party is unavailable. Some voicemail systems are configured to execute a software application or request another system to execute a software application to convert voicemail messages into text and to send the converted messages via SMS or email to one or more recipients.

SUMMARY

Concepts and technologies are described herein for a predictive messaging service for active voice calls. According to one aspect disclosed herein, a method for predictive messaging may include receiving, at a predictive messaging system, incoming audio associated with an active voice call, converting the audio into text, analyzing the text to predict a message that a user participating in the active voice call is expected to send, creating the message, and sending the message to a network element for delivery to a destination. In some embodiments, analysis of text to predict a message that a user participating in the active voice call is expected to send includes comparing the text to a pattern and determining based upon the comparison if at least a portion of the text matches the pattern. In some embodiments, the pattern is contained within a user profile associated with the user. In some embodiments, the user profile also contains the destination.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
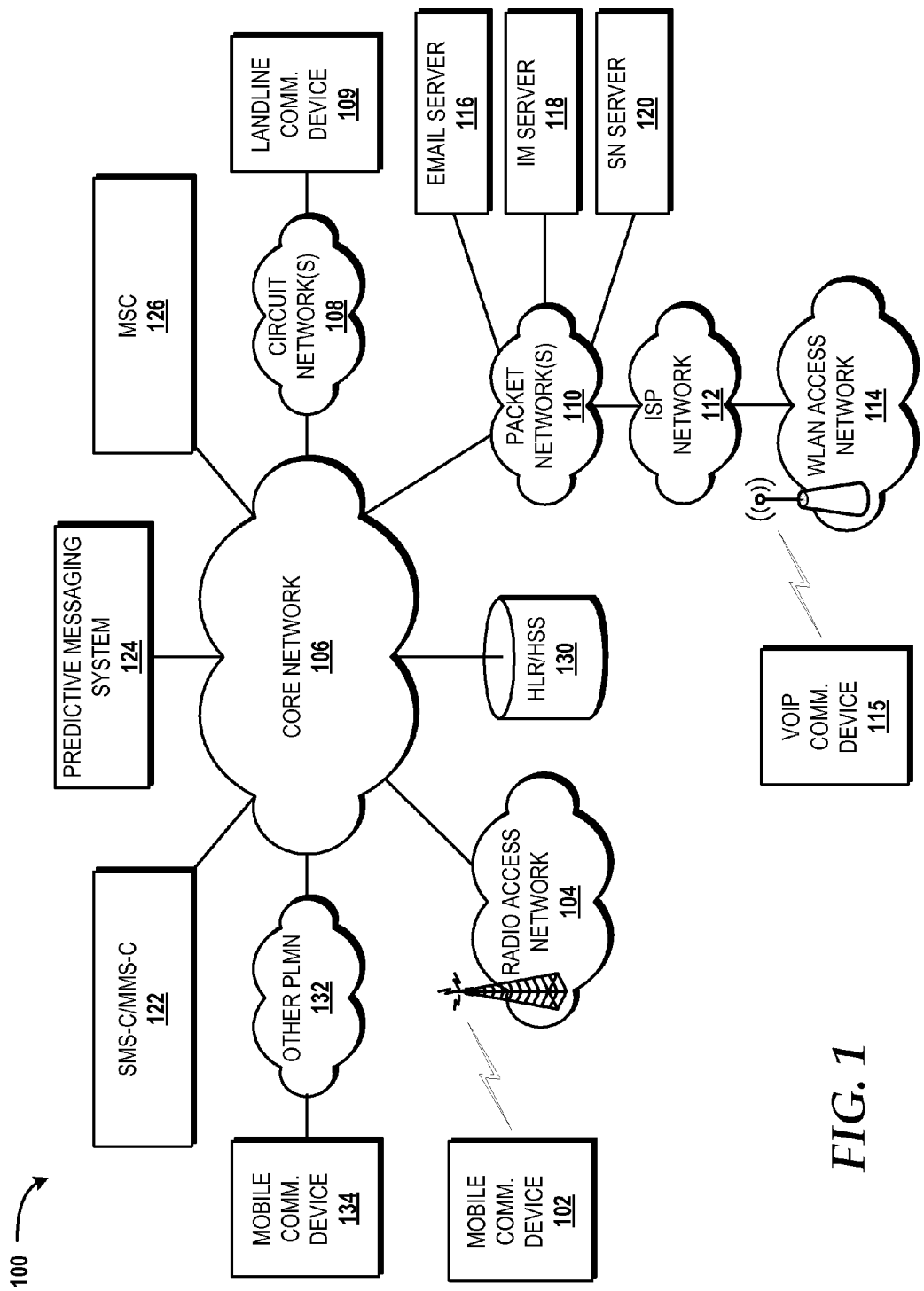
FIG. 1 is a block diagram illustrating aspects of an illustrative operating environment for various concepts disclosed herein.

The following detailed description is directed to concepts and technologies for a predictive messaging service for active voice calls. Through the embodiments presented herein, a predictive messaging system can predict, based upon information exchanged during a voice conversation occurring over an active voice call, one or more messages that a user is expected to send during or after the active voice call of which the user is a participant. Additional details regarding the various embodiments presented herein will be provided below with reference to FIGS. 1-8.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of a predictive messaging service for active voice calls will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 may be available without departing from illustrative embodiments described herein.

The operating environment 100 shown in FIG. 1 includes a mobile communications device ("mobile device") 102 operating in communication with one or more radio access networks ("RANs") 104. The mobile device 102 may be a cellular telephone, a smartphone, a mobile computer, a tablet computer, or other computing device that is configured with an integrated or an external, removable access component that facilitates wireless communication with the RAN 104. In some embodiments, the access component may be a cellular telephone that is in wired or wireless communication with a computer to facilitate a tethered data connection to the RAN 104. In other embodiments, the access component may include a wireless transceiver configured to send and receive data from the RAN 104 and a universal serial bus ("USB") or another communication interface for connection to the computer to enable tethering. In any case, the mobile device 102 may be configured to wirelessly communicate with the RAN 104 over an air interface in accordance with one or more radio access technologies so as to initiate, receive, and/or maintain voice calls with one or more other devices. The mobile device 102 may also be configured to send and receive Short Message Service ("SMS") messages, email, and other messages to other devices.

In some embodiments, the RAN 104 is a Global System for Mobile communications RAN ("GRAN"), a GSM EDGE RAN ("GERAN"), a Universal Mobile Telecommunications System ("UMTS") Terrestrial Radio Access Network ("UTRAN"), a Long Term Evolution ("LTE") RAN, any combination thereof, or the like. Moreover, although the mobile device 102 is illustrated as being in communication with a single RAN 104, the mobile device 102 may also communicate with other RANs, which may utilize different radio access technologies. As such, the mobile device 102 may be a multi-mode communications device.

The illustrated RAN 104 is in communication with a core network 106, which may include a circuit-switched core network ("CS CN"), a packet-switched core network ("PS CN"), and/or an IP multimedia subsystem ("IMS") core network. The core network 106 may utilize one or more mobile telecommunications technologies to provide voice and/or data services via the RAN 104 to a wireless wide area network ("WWAN") component (not shown) of the mobile device 102. The mobile telecommunications technologies may include, but are not limited to, GSM, Code Division Multiple Access ("CDMA") ONE, CDMA2000, UMTS, LTE, Worldwide Interoperability for Microwave Access ("WiMAX"), other 802.XX technologies, and/or the like. Moreover, the RAN 104 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and/or the like to provide access to the core network 106. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access standards. The core network 106 may be configured to provide voice and/or data communications with any combination of the above technologies. The core network 106 may be configured to or adapted to provide voice and/or data communications in accordance with future generation technologies.

The illustrated core network 106 is in communication with one or more circuit networks 108, such as a public switched telephone network ("PSTN"), an integrated services digital network ("ISDN"), and/or other circuit-switched network. The illustrated circuit network(s) 108 is in communication with a landline communications device ("landline device") 109, such as a landline telephone or other device that is configured to initiate, receive, and/or maintain voice calls with the mobile device 102 and/or one or more other devices, via the circuit network(s) 108.

The illustrated core network 106 is also in communication with one or more packet networks 110, such as an internet, the Internet, an intranet, or other packet-switched network. The illustrated packet-switched network(s) 110 is in communication with an internet service provider ("ISP") network 112, which may provide access to the packet network 110 for other packet-switched networks, such as a wireless local area network ("WLAN") access network 114. In some embodiments, the WLAN access network 114 is configured to operate in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN access network 114 is implemented utilizing one or more wireless WI-FI access points. In these embodiments, one or more of the wireless WI-FI access points may be another computing device, such as a cellular telephone, smartphone, computer, or tablet, that is functioning as a WI-FI hotspot, and that has connectivity to a WWAN, such as provided by the RAN 104 and the core network 106. Connections to the WLAN access network 114 may be secured via various encryption technologies including, but not limited to, WI-FI Protected Access ("WPA"), WPA2, Wired Equivalent Privacy ("WEP"), and the like.

The illustrated operating environment 100 also includes a Voice over IP communications device ("VoIP device") 115 that is in communication with the WLAN access network 114. The VoIP device 115 may be configured to communicate with the WLAN access network 114 to initiate, receive, and/or maintain voice calls with one or more other devices, such as the mobile device 102. The VoIP device 115 may be a cellular telephone, a smartphone, a mobile computer, a tablet computer, or another computer or other computing device that is configured to initiate, receive, and/or maintain voice calls using a VoIP technology with one or more other devices. In some embodiments, the mobile device 102 is configured like the VoIP device 115 to initiate, receive, and/or maintain voice calls with one or more other devices via the WLAN access network 114. In these embodiments, the mobile device 102 may be a dual-mode device that is also configured to communicate with the RAN 104.

The illustrated packet-switched network(s) 110 are in communication with one or more email servers 116, one or more instant messaging ("IM") service servers 118, and one or more social networking ("SN") servers 120. In some embodiments, the servers 116, 118, 120 are implemented as respective servers or computing systems including at least one respective computer. However, in other embodiments, two or more of the servers 116, 118, 120 are implemented as components of the same server or computing system, including a network or cloud-computing system. The email server 116, the IM service server 118, and the SN server 120 may be configured to communicate with the mobile device 102 over the packet network(s) 110 via a data connection established over the RAN 104 and the core network 106. The email server 116, the IM service server 118, and the SN server 120 may be configured to communicate with one or more devices, such as the mobile device 102 and/or the VoIP device 115, over the packet network(s) 110 via a data connection facilitated by the ISP network 112 and the WLAN access network 114.

The email server 116 may be configured to deliver email to/from the mobile device 102 and/or one or more other devices, such as email capable devices in communication with the packet network(s) 110 via the WLAN access network 114 and/or the core network 106. In some embodiments, the email server 116 is configured to utilize one or more email protocols such as, but not limited to, post office protocol ("POP"), Internet mail access protocol ("IMAP"), simple mail transfer protocol ("SMTP"), hypertext transfer protocol ("HTTP"), or some combination thereof, to deliver email to and receive email from one or more devices. The email server 116 may also be configured to receive email messages that have been converted from audio of an active voice call for delivery to one or more destinations, as will be described in greater detail below.

The IM service server 118 may be configured to deliver an IM service via which people can engage in a communication session to exchange text, images, voice, and/or video. In some embodiments, the IM service server 118 may be configured to utilize one or more IM protocols such as, but not limited, to Internet relay chat ("IRC"), Microsoft Messenger, available from MICROSOFT CORPORTATION, Windows Live Messenger, also available from MICROSOFT CORPORTATION, OSCAR, available from AOL, Skype protocol, available from Skype, Yahoo! Messenger, available from YAHOO, extensible messaging and presence protocol ("XMPP"), Facebook Messenger, available from FACEBOOK CORPORATION, or some combination thereof, to deliver instant messages to and receive instant messages, for example, from the mobile device 102. The IM service server 118 may also be configured to receive IM messages that have been converted from audio of an active voice call for delivery to one or more destinations, as will be described in greater detail below.

In some embodiments, the SN server 120 provides one or more social network services, which can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services are not mentioned herein for the sake of brevity. As such, the above embodiments are illustrative, and should not be construed as being limited in any way.

In some embodiments, the SN server 120 delivers social networking messages to/from devices such as the mobile device 102. Social networking messages may include, but are not limited to, social networking status messages, social networking chat messages, social networking update messages, or some combination thereof. In some embodiments, the SN server 120 utilizes the email server 116 and/or the IM service server 118, and/or a similar server or computer to provide certain functionality for a social networking messaging infrastructure. For example, a social networking chat may utilize services provided by the IM service server 118 or a similar server integrated within the SN server 120. In some embodiments, the SN server 120 is configured to receive social networking messages that have been converted from audio of an active voice call for delivery to one or more destinations, as will be described in greater detail below.

The illustrated core network 106 is also in communication with a short messaging service center ("SMS-C") and a multimedia messaging service center ("MMS-C"), illustrated as a combined SMS-C/MMS-C 122. The SMS-C and the MMS-C may be the same network entity or respective separate network entities within the operating environment 100. The SMS-C/MMS-C 122 may be configured to deliver SMS and/or MMS messages to the mobile device 102 and/or other compatible devices. The SMS-C/MMS-C 122 may also be configured to receive SMS messages that have been created by a predictive messaging system 124 for delivery to one or more destinations, as will be described in greater detail below.

The predictive messaging system 124, in some embodiments, is configured to capture audio associated with a voice conversation that occurs during an active voice call, convert the voice conversation into text, analyze the text to predict one or more messages that one or more participants in the voice call is expected to send as a result of information exchanged during the voice conversation, create the message(s), and send the message(s) to one or more network elements for delivery to one or more destinations. The illustrated predictive messaging system 124 is a single system. It is contemplated, however, that operations described herein as being performed by the predictive messaging system 124 may be performed by two or more systems, such as computers, that collectively function as the predictive messaging system 124. It is also contemplated that such systems may be co-located or may be remotely located.

In some embodiments, audio captured by the predictive messaging system 124 is captured in real-time. Real-time is defined herein as the actual time during which a process or event occurs. In the aforementioned embodiments, the predictive messaging system 124 captures audio as the audio is received by the predictive messaging system 124; as a result, the predictive messaging system 124 captures the audio in real-time from the perspective of the predictive messaging system 124. It should be understood that, for various reasons, the audio received by the predicative messaging system 124 may or may not be in real-time from the perspective of the participants in the voice call or from other network elements. In other words, some delay may exist between the time the participants speak and the time the audio resulting from the participants' speech is received by the predictive messaging system 124.

It should be understood that the capture of audio associated with voice conversations may be conducted under one or more agreements. For example, as a prerequisite for subscribing to or otherwise utilizing a predictive message service provided, at least in part, by a service provider that operates or is otherwise associated with the predictive messaging system 124, a user may be required to agree to one or more legal agreements to allow his or her voice conversations to be captured. Moreover, the captured audio may be stored at least temporarily in accordance with one or more legal agreements.

Audio associated with a voice conversation may include one or more utterances spoken by one or more participants in an active voice call. In some embodiments, the predictive messaging system 124 is configured to convert audio associated with a voice conversation into text utilizing one or more automatic speech recognition ("ASR") technologies. In some embodiments, the predictive messaging system 124 utilizes a trainable ASR technology that can be trained to analyze audio associated with specific participants in a voice call. In these embodiments, an ASR profile may be stored in a user profile associated with a participant in the voice call and accessed by the predictive messaging system 124 to analyze audio captured from the voice call.

In some embodiments, the predictive messaging system 124 is configured to store converted text for a period of time. In some embodiments, the period of time for which converted text is stored is defined in a user preference, which may be contained within a user profile. In some embodiments, the period of time for which converted text is stored is defined by a service provider that operates or is otherwise associated with the predictive messaging system 124. As noted above, one or more legal agreements may be in place to permit/deny storage of converted text and, in some implementations, a specification of the period of time for which converted text is allowed to be stored.

In some embodiments, the predictive messaging system 124 is configured to analyze converted text to predict one or more messages that one or more participants in the voice call is expected to send at least in part by comparing the converted text to one or more patterns of data. In some embodiments, a pattern of data to which the predictive messaging system 124 compares the converted text is defined by a user. In some embodiments, a pattern of data to which the predictive messaging system 124 compares the converted text is defined by a service provider that operates or is otherwise associated with the predictive messaging system 124. In some embodiments, a pattern of data to which the predictive messaging system 124 compares the converted text is defined by a third party.

In some embodiments, a pattern of data is defined at least in part by one or more rules that instruct the predictive messaging system 124 to identify certain information exchanged in a voice conversation occurring during an active voice call and, in response to identifying the information, perform one or more operations. In some embodiments, an operation performed by the predictive messaging system 124 as a result of a rule includes generating and sending one or more messages to one or more destinations. In these embodiments, the one or more destinations may also be defined by the rule. For instance, the one or more destinations may be one or more participants in the voice call (or more particularly one or more devices associated therewith) and/or other destinations such as email addresses, physical addresses, telephone numbers, IM user handles, social networking account handles, and the like, which may or may not be associated with the participants and/or their respective devices. In some other embodiments, an operation performed by the predictive messaging system 124 as a result of a rule include storing the information (e.g., in audio and/or text format) in a database or other storage associated with the predictive messaging system 124.

In some embodiments, a pattern of data to which the predictive messaging system 124 compares converted text includes one or more keywords. The keyword(s) may be defined as part of a rule. For example, one or more keywords that indicate the presence of an emergency may be defined in a pattern to identify an emergency situation discussed during an active voice call and to notify emergency personnel such as police, firefighters, and/or paramedics via one or more messages. In this manner, the participants of the voice call need not take additional steps to dial 9-1-1 or otherwise notify emergency personnel of an emergency situation. It should be appreciated that the above example use case is not exhaustive and that numerous additional and/or alternative use cases are not mentioned herein for the sake of brevity.

In some embodiments, keywords included in a pattern of data are defined by a user. For example, the user may define the keywords "product", "release", "cool", and "phone", so that when text includes some combination of these words, the predictive messaging system 124 predicts that one or more participants in a voice call from which the text is generated is expected to send a message that identifies the fact that a cool phone is going to be released. In some embodiments, a rule may specify that the presence of a certain keyword or keywords is to instruct the predictive messaging system 124 to search for information that is potentially associated therewith. In the above example, the predictive messaging system 124 may identify the keywords "product", "release", "cool", and "phone" and then search for a date or some other temporal hint (e.g., "in two weeks" or the like) also included in the text. The date or other temporal hint can then be added to the message that identifies the fact that a cool phone is going to be released and some indication as to when the release is expected to occur. As another example, if the text of a call includes the words "fire", "house", and "burning" which matches a pattern of data including those keywords, then the predictive messaging system 124 may create a message to the fire department and/or other emergency department stating information associated with or derived from the pattern of data such as "House fire suspected."

Another example of keyword usage is a user discussing financial information with a personal banker during a voice call. In this example, the predictive messaging system 124 may detect one or more keywords, such as bank name, account number, and transaction amount, and utilize these keywords to create a message that is then sent to an email account alerting the user of the transaction. In this manner, fraud and/or identity theft may be reduced or eliminated.

An additional example is corporate users discussing a sensitive project of which they are not allowed to discuss or divulge. In this case, the predictive messaging system 124 may detect key phrases and send an email message to corporate security and/or compliance officers alerting them of a violation in policy with regard to the sensitive project.

In some embodiments, a rule may instruct the predictive messaging system 124 to include location information such as, but not limited to, an address, a cell site ID, and/or Global Positioning System ("GPS") coordinates in a message generated by the predictive messaging system 124. In the above house fire example, a rule may instruct the predictive messaging system 124 to identify the calling party and/or the called party associated with a voice call, obtain address information for the calling party and/or the called party from a customer database or other source, and include the address information in a message to the fire department and/or other emergency department such that the message indicates that the house fire is suspected "at XXXX address," where) XXXX includes the address information obtained from the customer database or the other source. It should be appreciated that the above example is not exhaustive and that numerous additional and/or alternative examples are not mentioned herein for the sake of brevity.

In some embodiments, a pattern of data is associated with one or more telephone numbers, which may include called and/or calling numbers associated with participants in a voice call. In some embodiments, a pattern of data is utilized by the predictive messaging system 124 based upon a condition that two particular telephone numbers are associated with a given voice call. In this manner, the participants in a given voice call can be identified with some certainty and a pattern of data particular to those participants can be utilized by the predictive messaging system 124.

In some embodiments, a pattern of data incorporates user behavior. The user behavior may be what a user did after or during one or more voice calls or other communications. For example, if a user is a participant in a voice call in which a specific individual is also a participant, and after contacting that individual the user sends (always or within some specified threshold frequency) an SMS message including a summary of a voice conversation that occurred during the voice call, the predictive messaging system 124 may use this pattern of data that incorporates such user behavior to create one or more messages with a summary of one or more future voice calls. In this manner, the predictive messaging system 124 may learn a user's behavior over time and modify one or more patterns of data associated with a user to incorporate the learned used behavior.

In some embodiments, the predictive messaging system 124 is configured to identify inflection expressed in audio associated with a voice conversation occurring during an active voice call. Inflection may be used by the predictive messaging system 124 to associate a priority with information exchanged during a voice conversation. In some embodiments, a message created by the predictive messaging system 124 includes a priority identified by inflection used during a voice conversation from which the message is created. In some embodiments, keywords may be used/not used based upon inflection associated with the keywords. In this manner, the predictive messaging system 124 may ignore a keyword or utilize a keyword based upon the presence of inflection or lack thereof in association with the keyword as spoken.

In some embodiments, a message created by the predictive messaging system 124 is a text-based message. A text-based message may include one or more characters such as, but not limited to, letters, numerical digits, punctuation marks, and/or symbols. It is contemplated that a text-based message may utilize any character encoding to represent characters.

In some embodiments, a message created by the predictive messaging system 124 is or includes an image such as, but not limited to, a photograph, a graphic, or some other visual representation of a person, place, thing, or abstraction. Moving images such as GIFs and videos are also contemplated. In these embodiments, the message may be, but is not limited to, an MMS message, an email message in which the image is embedded in a body thereof or attached as an email attachment thereto, or a social networking post to which the image is associated in some way. Also in these embodiments, the image may be referenced using one or more keywords included in a pattern of data. For example, a voice conversation may reveal that a "recent" "baby" "picture" is really good, and the predictive messaging system 124 may be instructed to, based upon the presence of those keywords, access a device to obtain a "recent" "baby" "picture." The device may be the device utilized by a participant that uttered the keywords in the voice conversation. Moreover, image metadata may be used to determine a date, and the pattern of data may be used to determine if the date is recent per some specification. This is yet another non-exhaustive example.

In some embodiments, the network element to which the predictive messaging system 124 sends one or more messages is the SMS-C/MMS-C 122 for delivery of the message(s) to one or more destinations via SMS or MMS. In some other embodiments, the network element is the email server 116 for delivery of the message(s) to the one or more destinations via email. In some other embodiments, the network element is the IM server 118 for delivery of the message(s) to the one or more destinations via instant message. In some other embodiments, the network element is the SN server 120 for delivery of the message(s) to the one or more destinations via social networking message. In some embodiments, the predictive messaging system 124 sends the message(s) to multiple network elements. In these embodiments, the same message may be sent to multiple network elements so that the message is delivered to the one or more destinations via more than one messaging technology.

In some embodiments, the predictive messaging system 124 is configured to convert a message into a format useable by a network element to which the message is to be sent. For example, in preparation to send a message to the SMS-C/MMS-C 122, the predictive messaging system 124 may format the message as an SMS message. In some other embodiments, the predictive messaging system 124 is configured to provide a message in a plain text format to the network element, which may then format the message into a format for delivery to one or more destinations.

The core network 106 may also be in communication with a mobile switching center ("MSC") 126. The MSC 126 is configured to function as a telecommunications switch. Although a single MSC 126 is illustrated, multiple MSCs are contemplated. The predictive messaging system 124, in some embodiments, is configured to interface with the MSC 126 directly or through the core network 106 to capture audio of a voice conversation occurring during a voice call between two or more devices.

The core network 106 may also be in communication with a home location register ("HLR") and a home subscriber server ("HSS"), illustrated as a combined HLR/HSS 130. The HLR/HSS 130 is shown as a combined network element for convenience and ease of illustration, although the HLR and the HSS may be separate network elements. The HLR/HSS 130 may include a database configured to provide routing information for mobile terminated calls and various messaging communications. In some embodiments, the HLR/HSS 130 includes a computer configured to support the HLR/HSS database functionality described herein. The HLR/HSS 130 may also be configured to maintain subscriber data that is distributed to the relevant visitor location register ("VLR") (not shown) or serving general packet radio service support node ("SGSN") (also not shown) through an attach process and to provide mobility management procedures, such as location area and routing area updates.

In some embodiments, the core network 106 is or includes an IP Multimedia Subsystem ("IMS") network. The IMS network may include the HSS portion of the HLR/HSS 130. The HSS may be a master user database that stores subscription-related information, such as subscriber account details and subscriber profiles, performs authentication and authorization of the user, and provides information about a subscriber's location and IP address. In general, the HSS performs similar functions for an IMS network that an HLR provides for GSM and UMTS-based networks.

The core network 106 may also facilitate communication with one or more other public land mobile networks ("PLMNs") 132. The other PLMN 132 may be, for example, a foreign network, such as a mobile telecommunications network operated by another service provider or the same service provider that operates the core network 106. In the illustrated embodiment, another mobile communications device ("mobile device") 134 is operating in communication with the other PLMN 132. The mobile device 134 may be a cellular telephone, a smartphone, a mobile computer, a tablet computer, or other computing device that is configured with an integrated or an external, removable access component that facilitates wireless communication with the PLMN 132 over one or more RANs (not shown) associated with the other PLMN 132. In some embodiments, the access component may be a cellular telephone that is in wired or wireless communication with a computer to facilitate a tethered data connection to one or more RANs associated with the other PLMN 132. In other embodiments, the access component may include a wireless transceiver configured to send and receive data from the other PLMN 132 and a USB or another communication interface for connection to the computer to enable tethering. In any case, the mobile device 134 may be configured to wirelessly communicate with the other PLMN 132 over an air interface in accordance with one or more radio access technologies so as to initiate, receive, and/or maintain voice calls with one or more other devices. The mobile device 134 may also be configured to send and receive SMS messages, email, and other messages to other devices.

In some embodiments, the mobile device 102 may be configured to access voice and/or data services while roaming on the other PLMN 132. In some embodiments, the mobile device 102 may be roaming on the other PLMN 132, but only has access to circuit-switched based services such as making and receiving voice calls, receiving voice mail waiting indications, retrieving voice mail, and sending and receiving SMS messages. However, due to contractual agreements between the service provider of the core network 106 and the service provider of the other PLMN 132, or for some other reason, the mobile device 102 may lack packet-switched based services such as MMS, IM, and email while roaming on the other PLMN 132.

Figure 2:
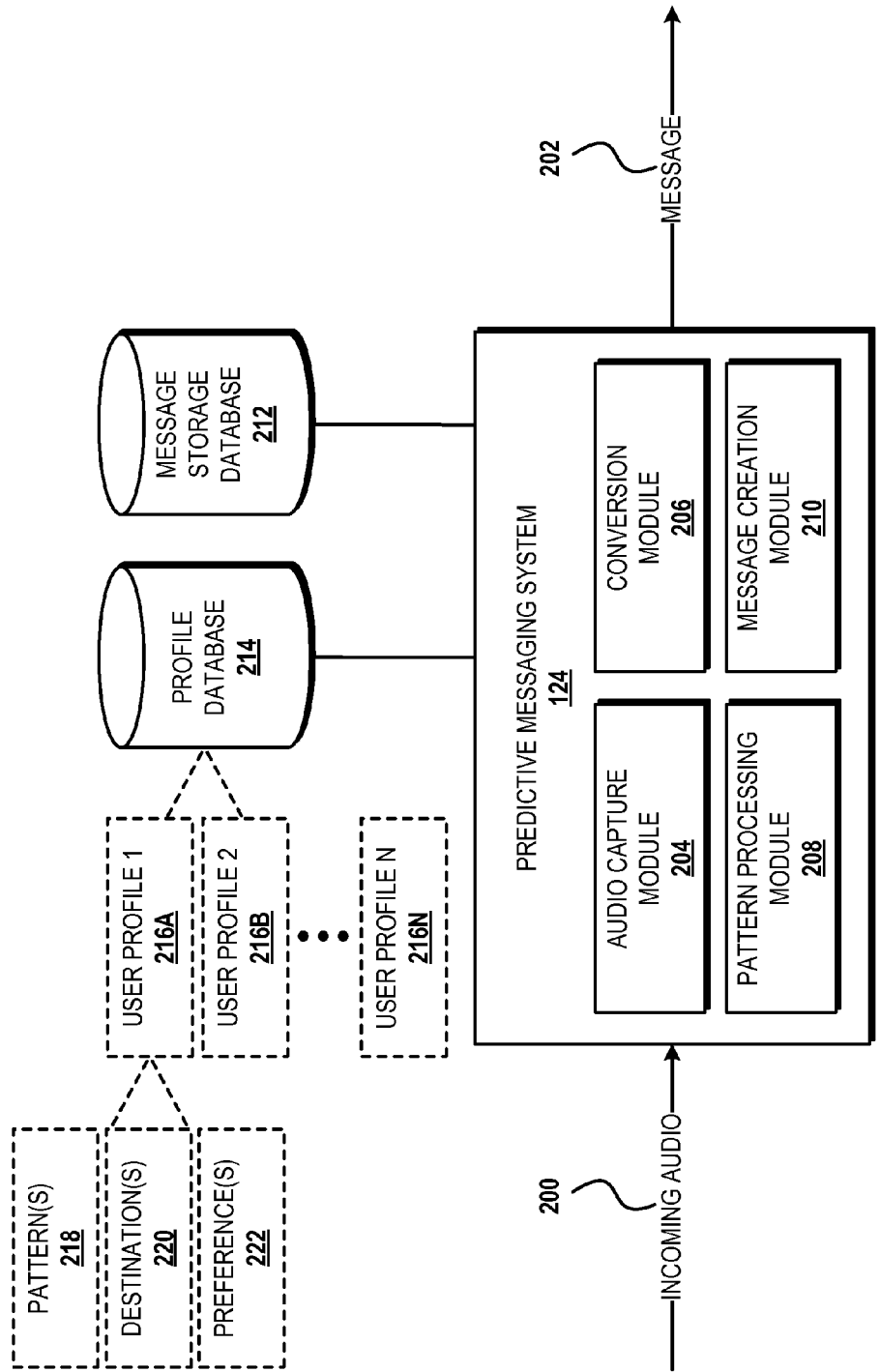
FIG. 2 is a block diagram illustrating aspects of an illustrative predictive messaging system capable of implementing aspects of various embodiments disclosed herein.

Turning now to FIG. 2, the predictive messaging system 124 will be described in greater detail. In the illustrated embodiment, the predictive messaging system 124 is configured to receive incoming audio 200 associated with an active voice call and to output a message 202 that the predictive messaging system 124 expects a user participating in the active voice call to send during or after the voice call. The illustrated predictive messaging system 124 includes an audio capture module 204, a conversion module 206, a pattern processing module 208, and a message creation module 210. The illustrated predictive messaging system 124 is in communication with a message storage database 212 and a profile database 214.

The message storage database 212 is configured to store the incoming audio 200, text generated from the incoming audio 200, and/or the message 202. In some embodiments, the predictive messaging system 124 is configured to store any of the above data in the message storage database 212 for a period of time. In some embodiments, the period of time for which data is stored is defined in a user preference, which may be contained within a user profile. In some embodiments, the period of time for which data is stored is defined by a service provider that operates or is otherwise associated with the predictive messaging system 124. One or more legal agreements may be in place to permit/deny storage of data and, in some instances, a specification of the period of time for which data associated with a voice call is allowed to be stored.

The illustrated profile database 214 is configured to store one or more user profiles 216A-216N (hereinafter referred to collectively and/or generically as "user profiles 216"). Each of the user profiles 216 may include one or more patterns of data 218 (hereinafter "the pattern(s) 218"), one or more destinations 220 (hereinafter "the destination(s) 220"), and one or more preferences 222 (hereinafter "the preferences 222").

In some embodiments, the pattern(s) 218 is defined by a user. In some embodiments, the pattern(s) 218 is defined by a service provider that operates or is otherwise associated with the predictive messaging system 124. In some embodiments, the pattern(s) 218 is defined by a third party.

In some embodiments, the pattern(s) 218 is defined at least in part by one or more rules that instruct the predictive messaging system 124 to identify certain information exchanged in a voice conversation occurring during an active voice call and, in response to identifying the information, perform one or more operations. In some embodiments, an operation performed by the predictive messaging system 124 as a result of a rule includes generating and sending one or more messages to one or more destinations. In these embodiments, the one or more destinations may also be defined by the rule. For instance, the one or more destinations may be one or more participants in the voice call (or more particularly one or more devices associated therewith) and/or other destinations such as email addresses, physical addresses, telephone numbers, IM user handles, social networking account handles, and the like, which may or may not be associated with the participants and/or their respective devices. In some other embodiments, an operation performed by the predictive messaging system 124 as a result of a rule include storing the information (e.g., in audio and/or text format) in the message storage database 212.

In some embodiments, the pattern(s) 218 to which the predictive messaging system 124 compares converted text includes one or more keywords. The keyword(s) may be defined as part of a rule. For example, one or more keywords that indicate the presence of an emergency may be defined in a pattern to identify an emergency situation discussed during an active voice call and to notify emergency personnel such as police, firefighters, and/or paramedics via one or more messages. In this manner, the participants of the voice call need not take additional steps to dial 9-1-1 or otherwise notify emergency personnel of an emergency situation. It should be appreciated that the above example use case is not exhaustive and that numerous additional and/or alternative use cases are not mentioned herein for the sake of brevity.

In some embodiments, keyword(s) included in the pattern (s) 218 is defined by a user. For example, the user may define the keywords "product", "release", "cool", and "phone", so that when text includes some combination of these words, the predictive messaging system 124 predicts that one or more participants in a voice call from which the text is generated is expected to send a message that identifies the fact that a cool phone is going to be released. In some embodiments, a rule may specify that the presence of a certain keyword or keywords is to instruct the predictive messaging system 124 to search for information that is potentially associated therewith. In the above example, the predictive messaging system 124 may identify the keywords "product", "release", "cool", and "phone" and then search for a date or some other temporal hint (e.g., "in two weeks" or the like) also included in the text. The date or other temporal hint can then be added to the message that identifies the fact that a cool phone is going to be released and some indication as to when the release is expected to occur. As another example, if the text of a call includes the words "fire", "house", and "burning" which matches a pattern of data including those keywords, then the predictive messaging system 124 may create a message to the fire department and/or other emergency department stating information associated with or derived from the pattern of data such as "House fire suspected."

In some embodiments, a rule may instruct the predictive messaging system 124 to include location information such as, but not limited to, an address, a cell site ID, and/or GPS coordinates in a message generated by the predictive messaging system 124. In the above house fire example, a rule may instruct the predictive messaging system 124 to identify the calling party and/or the called party associated with a voice call, obtain address information for the calling party and/or the called party from a customer database or other source, and include the address information in a message to the fire department and/or other emergency department such that the message indicates that the house fire is suspected "at XXXX address," where XXXX includes the address information obtained from the customer database or the other source. It should be appreciated that the above example is not exhaustive and that numerous additional and/or alternative examples are not mentioned herein for the sake of brevity.

In some embodiments, the pattern(s) 218 is associated with one or more telephone numbers, which may include called and/or calling numbers associated with a participants in a voice call. In some embodiments, the pattern(s) 218 is utilized by the predictive messaging system 124 based upon a condition that two particular telephone numbers are associated with a given voice call. In this manner, the participants in a given voice call can be identified with some certainty and a pattern of data particular to those participants can be utilized by the predictive messaging system 124.

In some embodiments, the pattern(s) 218 incorporates user behavior. The user behavior may be what a user did after or during one or more voice calls or other communications. For example, if a user is a participant in a voice call in which a specific individual is also a participant, and after contacting that individual the user sends (always or within some specified threshold frequency) an SMS message including a summary of a voice conversation that occurred during the voice call, the predictive messaging system 124 may use this pattern of data that incorporates such user behavior to create one or more messages with a summary of one or more future voice calls. In this manner, the predictive messaging system 124 may learn a user's behavior over time and modify the pattern(s) 218 associated with a user to incorporate the learned user behavior.

In some embodiments, the predictive messaging system 124 is configured to identify inflection expressed in audio associated with a voice conversation occurring during an active voice call. Inflection may be used by the predictive messaging system 124 to associate a priority with information exchanged during a voice conversation. In some embodiments, a message created by the predictive messaging system 124 includes a priority identified by inflection used during a voice conversation from which the message is created. In some embodiments, keywords may be used/not used based upon inflection associated with the keywords. In this manner, the predictive messaging system 124 may ignore a keyword or utilize a keyword based upon the presence of inflection or lack thereof in association with the keyword as spoken.

In some embodiments, the destination(s) 220 include a mobile device such as the mobile device 102 and/or the mobile device 134, a landline communications device such as the landline device 109, a VoIP communications device such as the VoIP device 115, and/or another communications device configured to receive messages from the predictive messaging system 124. The destination(s) 220 may alternatively include a telephone number, Session Initiation Protocol ("SIP") address, email address, or other identifier associated with a mobile device.

In some embodiments, the preference(s) 222 includes a record preference that indicates whether or not an associated user has given the predictive messaging system 124 permission to record the incoming audio 200. The record preference may be governed by one or more legal agreements.

In some embodiments, the preference(s) 222 includes a period of time preference that indicates a period of time for which the incoming audio 200, text generated as a result of a conversion of the incoming audio 200 to text, and/or the message generated by the predictive messaging system 124 may be stored in the message storage database 212. The period of time preference may be governed by one or more legal agreements.

In some embodiments, the preference(s) 222 includes a location preference that indicates one or more locations in which a user's device is to be in order for the predictive messaging service to be active. For instance, the user may specify through a location preference to activate the predictive messaging service provided at least in part by the predictive messaging system 124 when the user's device is at a particular location, which may be defined by a cell site ID, GPS coordinates, and/or other location information available from the HRL/HSS 130 or other network elements.

In some embodiments, the preference(s) 222 include an ASR profile for a user. The ASR profile may be utilized by the conversion module 206 to perform conversion of the incoming audio 200 to text.

The audio capture module 204 is configured to receive the incoming audio 200 associated with an active voice call. In this regard, the audio capture module 204 is configured to facilitate communication between the predictive messaging system 124 and the core network 106 to receive the incoming audio 200. In some embodiments, the audio capture module 204 communicates with one or more MSCs, such as the MSC 126, that is involved in handling the active voice call. In some other embodiments, the audio capture module 204 communicates with the circuit network(s) 108, the packet network(s) 110, and/or the other PLMN 132 to receive the incoming audio 200.

The conversion module 206 is configured to convert the incoming audio 200 into text. In some embodiments, the conversion module 206 is configured to utilize one or more ASR technologies to convert the incoming audio 200 into text. In some embodiments, the predictive messaging system 124 utilizes a trainable ASR technology that can be trained to analyze audio associated with particular users. In these embodiments, an ASR profile may be stored in a user profile, such as one of the preferences 222.

The pattern processing module 208 is configured to compare text output by the conversion module 206 to one or more of the pattern(s) 218 in an analysis of the text to predict the message 202. In some embodiments, the pattern processing module 208 utilizes the preference(s) 222 to select which pattern of a plurality of patterns to use for a comparison.

The message creation module 210 is configured to create the message 202 based upon output of the pattern processing module 208. In some embodiments, the message creation module 210 is configured to convert the message 202 into a format useable by a network element to which the message is to be sent. For example, in preparation to send a message to the SMS-C/MMS-C 122, the predictive messaging system 124 may format the message as an SMS message. In some other embodiments, the predictive messaging system 124 is configured to provide the message 202 in a plain text format to a network element, which may then format the message 202 into a format for delivery to one or more destinations, such as defined by the destination(s) 220.

Figure 3:
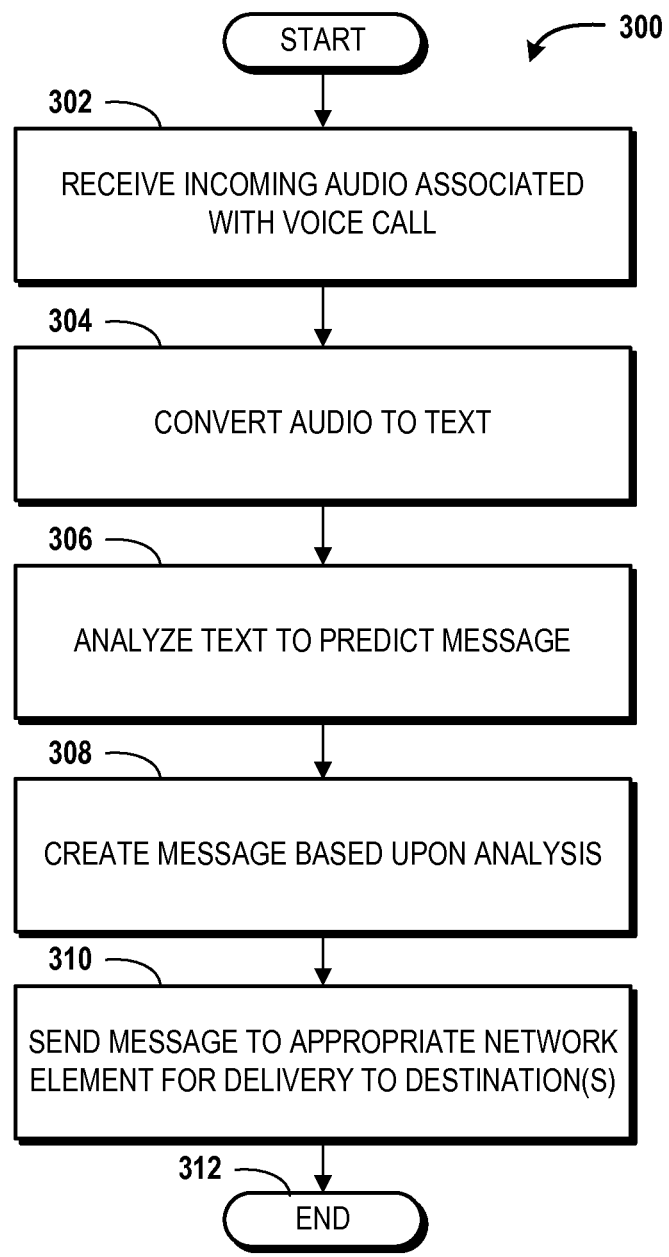
FIG. 3 is a flow diagram illustrating aspects of a method for predicting a message that a user is expected to send based upon information exchanged during a voice call and distributing the messages to one or more destinations, according to an illustrative embodiment.

Turning now to FIG. 3, a flow diagram illustrating aspects of a method 300 for predicting a message that a user is expected to send based upon information exchanged during a voice call and distributing the messages to one or more destinations will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in its entirety. Some or all operations of the methods, and/or substantially equivalent operations, can be performed by execution of computer-executable instructions included on a computer-storage media, as defined below. The term "computer-executable instructions," and variants thereof, as used in the description and claims, is used expansively herein to include routines, applications, software, application modules, program modules, programs, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 300 begins and proceeds to operation 302, wherein the predictive messaging system 124 receives incoming audio associated with an active voice call. From operation 302, the method 300 proceeds to operation 304, wherein the predictive messaging system 124 converts the audio into text. From operation 304, the method 300 proceeds to operation 306, wherein the predictive messaging system 124 analyzes the text to predict a message that a user participating in the voice call is expected to send to one or more destinations. It is contemplated that the analysis at operation 306 may be used to predict multiple messages. From operation 306, the method 300 proceeds to operation 308, wherein the predictive messaging system 124 creates the message based upon the analysis performed at operation 306. From operation 310, the method 300 proceeds to operation 310, wherein the predictive messaging system 124 sends the message to a network element for delivery to one or more destination(s). In some embodiments, the predictive messaging system 124 sends the message during the voice call. In some other embodiments, the predictive messaging system 124 sends the message after the voice call. The method 300 then proceeds to operation 312, wherein the method 300 may end.

Figure 4:
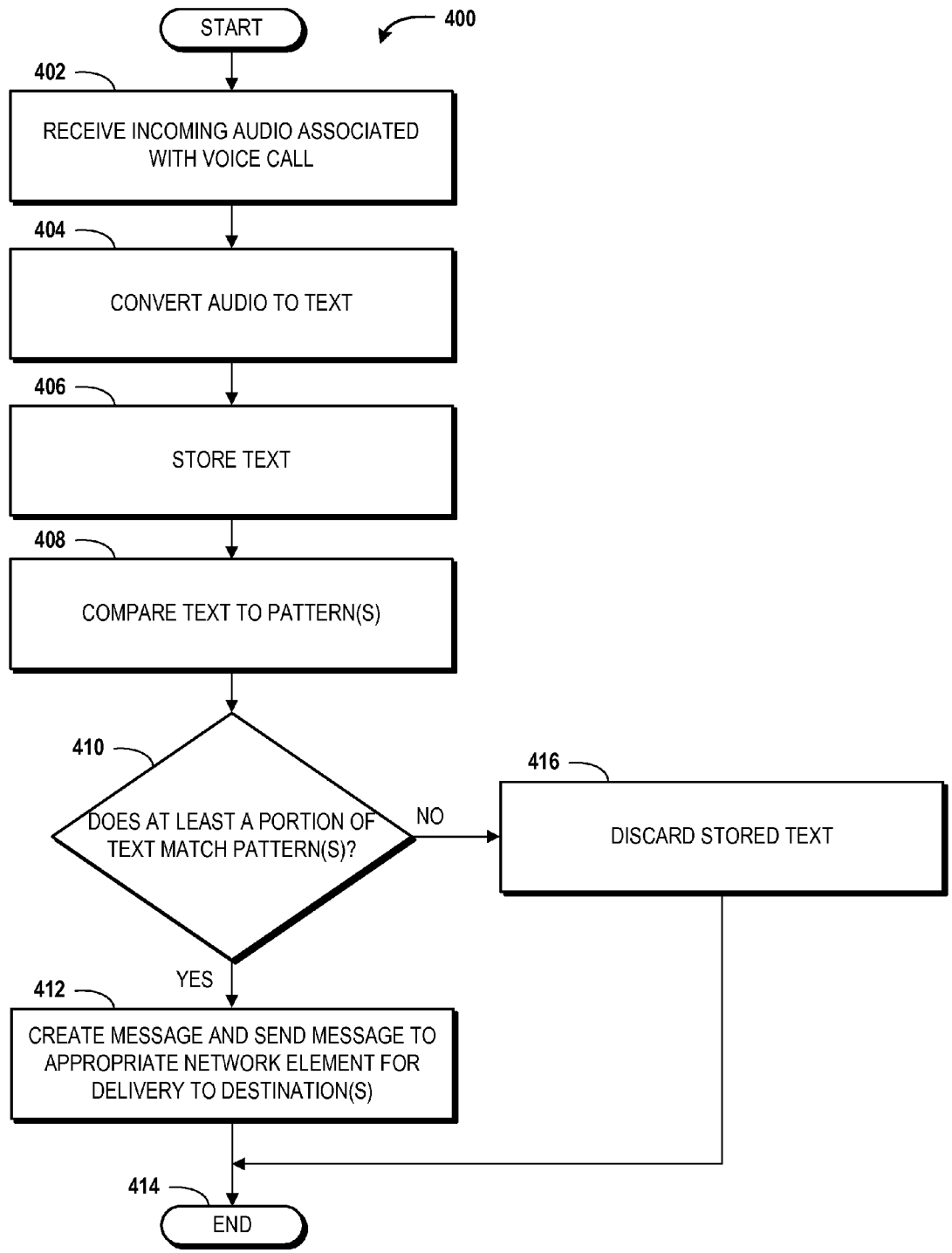
FIG. 4 is a flow diagram illustrating aspects of another method for predicting a message that a user is expected to send based upon information exchanged during a voice call and distributing the messages to one or more destinations, according to an illustrative embodiment.

Turning now to FIG. 4, a flow diagram illustrating aspects of method 400 for predicting a message that a user is expected to send based upon information exchanged during a voice call and distributing the messages to one or more destinations will be described, according to an illustrative embodiment. The method 400 begins and proceeds to operation 402, wherein the predictive messaging system 124 receives incoming audio associated with an active voice call. From operation 402, the method 400 proceeds to operation 404, wherein the predictive messaging system 124 converts the audio into text. From operation 404, the method 400 proceeds to operation 406, wherein the predictive messaging system 124 stores the text, for example, in the message storage database 212 (shown in FIG. 2). From operation 406, the method 400 proceeds to operation 408, wherein the predictive messaging system 124 compares the text to one or more patterns, for example, contained in a user profile associated with a user for which a message is to be predicted.

From operation 408, the method 400 proceeds to operation 410, wherein the predictive messaging system 124 determines whether at least a portion of the text matches the one or more patterns. The predictive messaging system 124 may additionally consider one or more rules that define at least in part the one or more patterns. The rules may be directed to telephone numbers, locations, and/or other information associated with the participants of the voice call as described in greater detail herein above. If so, the method 400 proceeds to operation 412, wherein the predictive messaging system 124 creates a message including at least the portion of the text that was determined to match the one or more patterns. Also at operation 412, the predictive messaging system 124 sends the message to a network element for delivery to one or more destination(s). The method 400 then proceeds to operation 414, wherein the method 400 may end.

If, however, at operation 410, the predictive messaging system 124 determines that at least a portion of the text does not match the one or more patterns, the method 400 proceeds to operation 416, wherein the predictive messaging system 124 discards the stored text. The method 400 then proceeds to operation 414, wherein the method 400 may end.

Figure 5:
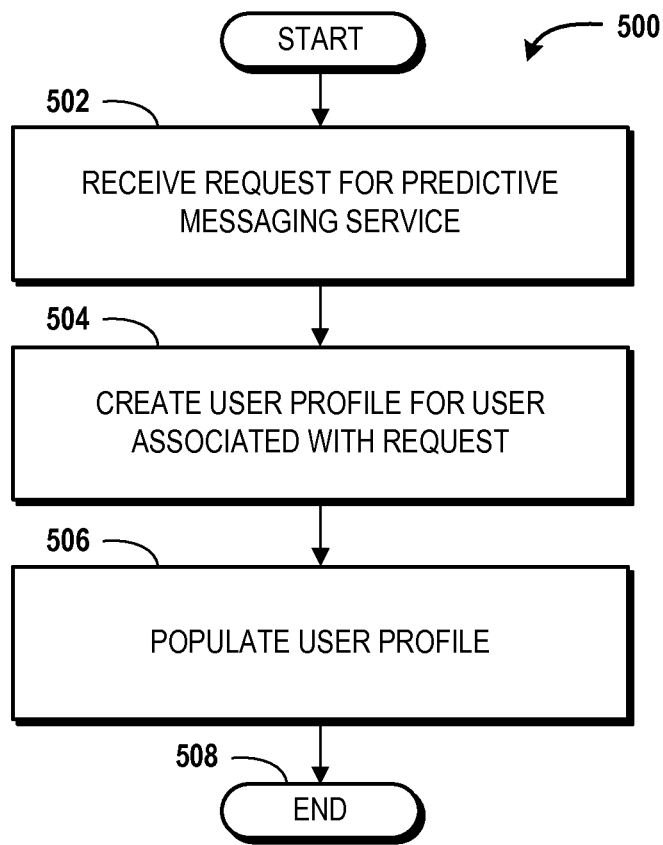
FIG. 5 is a flow diagram illustrating aspects of a method for creating a user profile for a predictive messaging service, according to an illustrative embodiment.

Turning now to FIG. 5, a flow diagram illustrating aspects of a method 500 for creating a user profile for a predictive messaging service will be described, according to an illustrative embodiment. The method 500 begins and proceeds to operation 502, wherein the predictive messaging system 124 receives a request for predictive message service. In some embodiments, the request includes a telephone number associated with an account for which the predictive message service is requested.

From operation 502, the method 500 proceeds to operation 504, wherein the predictive messaging system 124 creates a user profile for a user participating in the request, for example, as identified by a telephone number or other subscriber identifier. The user profile may include, but is not limited to including, one or more patterns, one or more destinations, and one or more preferences, as described in greater detail above with reference to FIG. 2. From operation 504, the method 500 proceeds to operation 506, wherein the predictive messaging system 124 populates the user profile. In some embodiments, the user profile is populated with default values for pattern, destination, and/or preference data of the user profile. In some other embodiments, the user may be prompted to provide details for this initial population of user profile data. The user may provide details via voice conversation, chat conversation, email exchange, an application executing on the user's device, and/or via a web interface. From operation 506, the method 500 proceeds to operation 508, wherein the method 500 may end.

Figure 6:
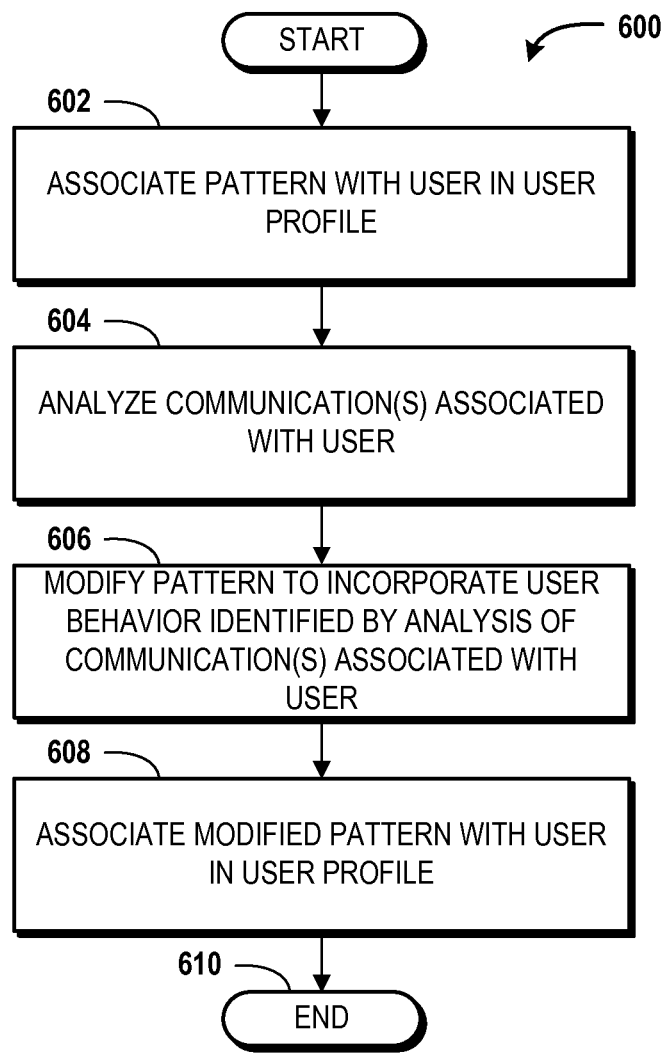
FIG. 6 is a flow diagram illustrating aspects of a method for modifying a pattern utilized to predict a message that a user is expected to send based upon information exchanged during a voice call, according to an illustrative embodiment.

Turning now to FIG. 6, a flow diagram illustrating aspects of a method 600 for modifying a pattern utilized to predict a message that a user is expected to send based upon information exchanged during a voice call will be described, according to an illustrative embodiment. The method 600 begins and proceeds to operation 602, wherein the predictive messaging system 124 associates a pattern with a user in a user profile. From operation 602, the method 600 proceeds to operation 604, wherein the predictive messaging system 124 analyzes one or more communications associated with the user. The communication may include one or more messages sent by the user. From operation 604, the method proceeds to operation 606, wherein the predictive messaging system 124 modifies the pattern to incorporate user behavior identified by the analysis of the one or more communications. From operation 606, the method 600 proceeds to operation 608, wherein predictive messaging system 124 associates the modified pattern with the user in the user profile. From operation 608, the method 600 proceeds to operation 610, wherein the method 600 may end.

Figure 7:
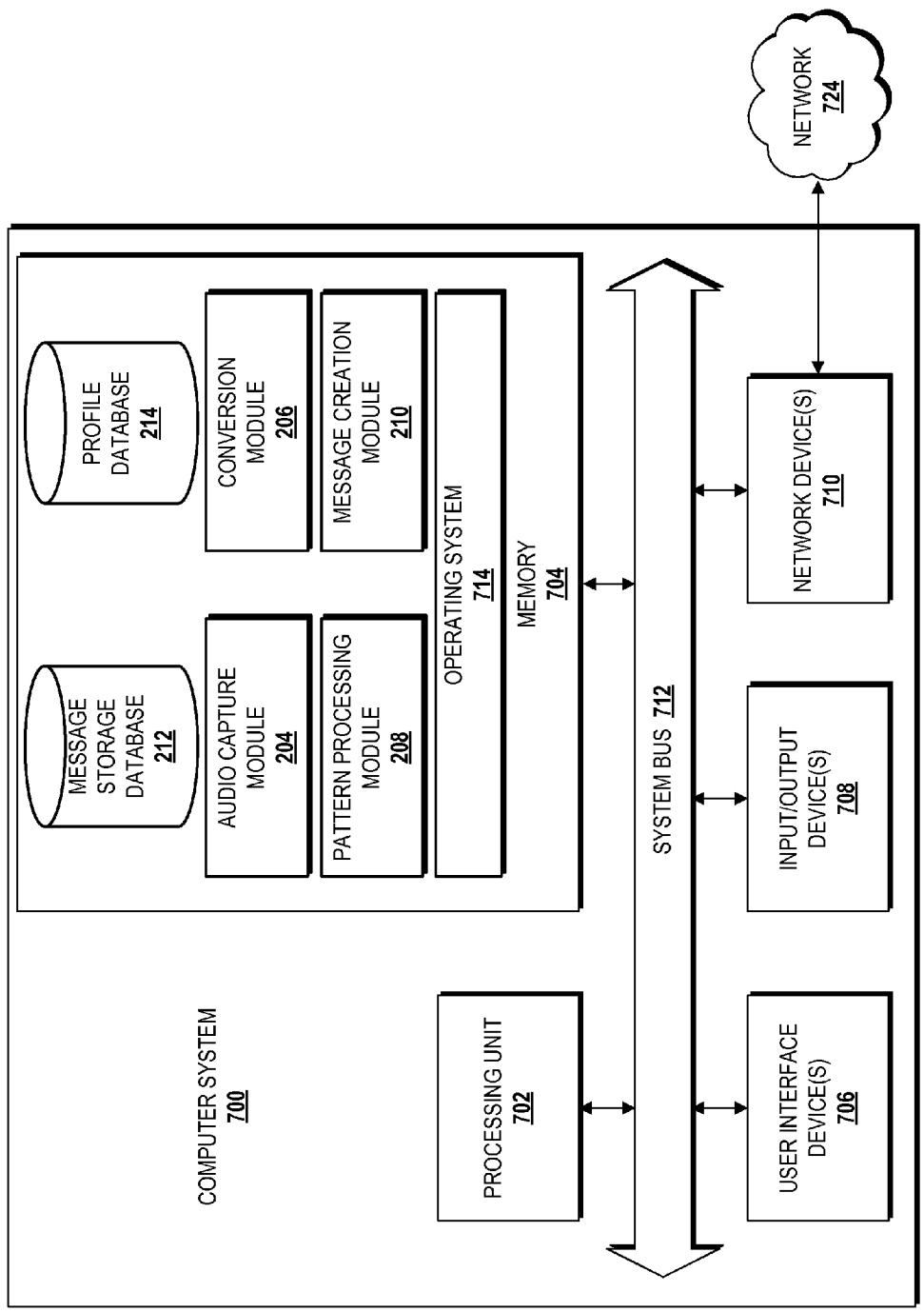
FIG. 7 is a computer architecture diagram illustrating an illustrative computer hardware and software architecture for a computing system capable of implementing aspects of the embodiments presented herein.

FIG. 7 is a block diagram illustrating a computer system 700 configured to perform various operations disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules, including the audio capture module 204, the conversion module 206, the pattern processing module 208, and the message creation module 210. The illustrated memory 704 also includes the message storage database 212 and the profile database 214. The modules 204-210 are configured to be executed by the processing unit 702 to perform the respective various operations described herein above, for example, with reference to the methods 300, 400, 500, 600.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 724, such as one or more of the networks illustrated and described with reference to FIG. 1 or some other network. Examples of the network devices 710 include, but are not limited to, a modem, a radio frequency ("RF") or infrared ("IR") transceiver, a telephonic interface, a bridge, a router, or a network card. The network 724 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 724 may be a wired network such as, but not limited to, a wide area network ("WAN") such as the Internet, a local area network ("LAN") such as the Ethernet, a wired personal area network ("PAN"), or a wired metropolitan area network ("MAN").

The network 724 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 724. Therefore, the embodiments presented herein should not be construed as being limited to a particular mobile telecommunications technology and/or standards utilizing such technologies.

Figure 8:
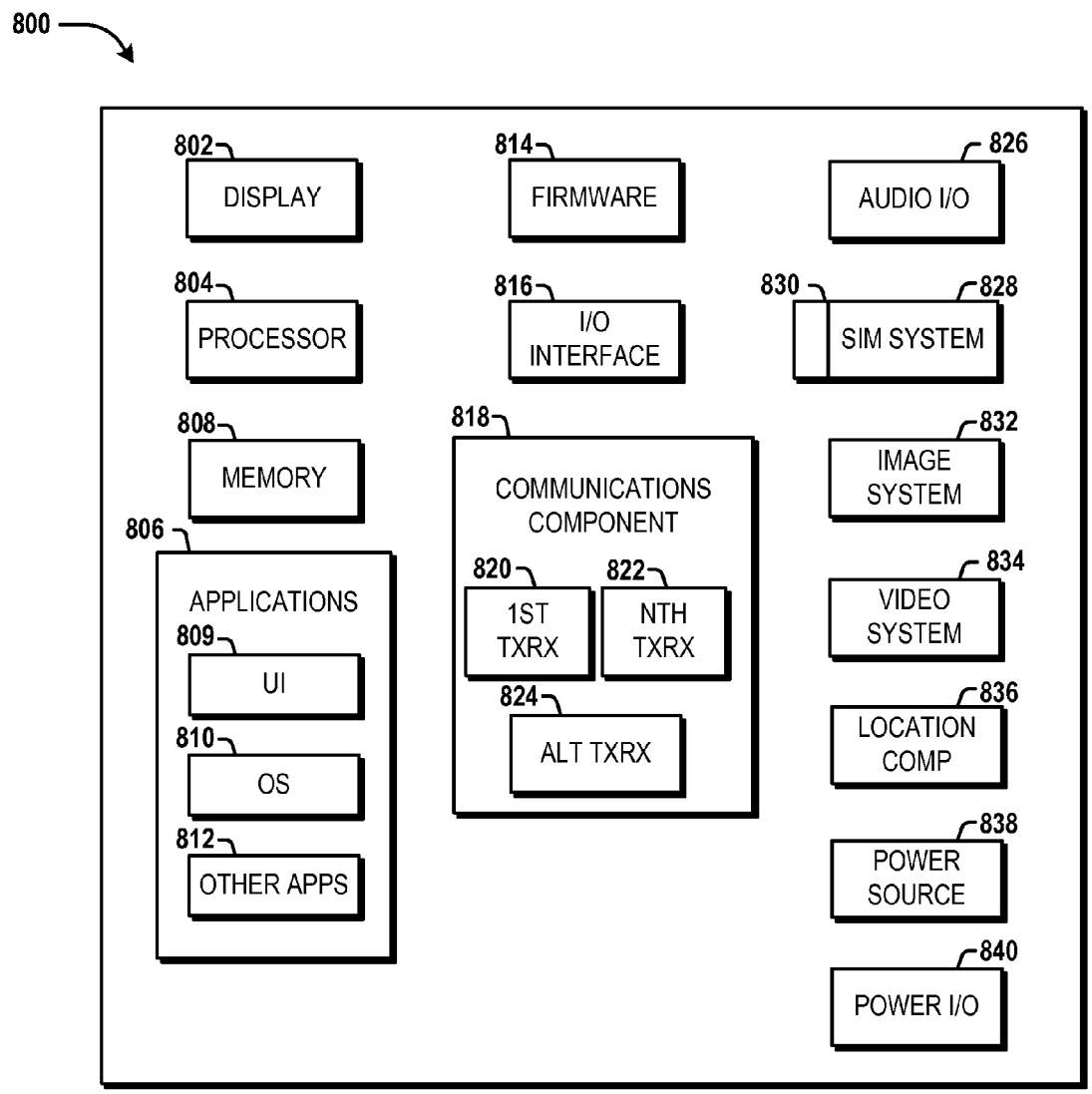
FIG. 8 is a mobile device architecture diagram illustrating an illustrative mobile device hardware and software architecture for a mobile device capable of implementing aspects of the embodiments disclosed herein.

Turning now to FIG. 8, an illustrative mobile device 800 and components thereof will be described. Although connections are not shown between the components illustrated in FIG. 8, the components can interact with each other to carry out device functions. In some embodiments, for example, the components are arranged so as to communicate via one or more busses (not shown). It should be understood that FIG. 8 and the following description are intended to provide a general understanding of a suitable environment in which various aspects of embodiments can be implemented. The mobile devices 102, 134 described herein above may be configured like the mobile device 800. It should be understood that the mobile devices 102, 134 may include additional functionality or include less functionality than now described.

As illustrated in FIG. 8, the mobile device 800 includes a display 802 for displaying data including, but not limited to, graphical user interface ("GUI") elements, text, images, video, virtual keypads and/or keyboards, messaging data, notification messages, metadata, internet content, device status, time, date, calendar data, device preferences, map and location data, and the like. The mobile device 800 also includes a processor 804 for processing data and/or executing computer-executable instructions of one or more applications 806 stored in a memory 808. In some embodiments, the applications 806 include a UI application 809. The UI application 809 interfaces with an operating system ("OS") application 810 to facilitate user interaction with device functionality and data. In some embodiments, the OS application 810 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

The UI application 809 aids a user in entering message content, viewing received messages, answering/initiating calls, entering/deleting data, entering and setting user IDs and passwords for device access, configuring settings, manipulating address book content and/or settings, multimode interaction, interacting with other applications 812, and otherwise facilitating user interaction with the OS application 810, and the other applications 812.

In some embodiments, the other applications 812 include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 806 or portions thereof are stored in the memory 808 and/or in a firmware 814, and are executed by the processor 804. The firmware 814 may also store code for execution during device power up and power down operations.

The mobile device 800 also includes an input/output ("I/O") interface 816 for the input/output of data such as location information, presence status information, user IDs, passwords, and application initiation (start-up) requests. In some embodiments, the I/O interface 816 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 800 is configured to synchronize with another device (e.g., a computer) to transfer content stored to/from the mobile device 800. In some embodiments, the mobile device 800 is configured to receive updates to one or more of the applications 806 via the I/O interface 816. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device instead of, or in addition to, a communications component 818.

The communications component 818 interfaces with the processor 804 to facilitate wireless communications with one or more networks such as those illustrated in FIG. 1. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers each configured to communicate over the same or a different wireless technology standard. For example, the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like. In addition, the communications component 818 may facilitate data communications using GPRS, EDGE, the HSPA protocol family including HSDPA, EUL or otherwise termed HSUPA, HSPA+, and various other current and future wireless data access standards.

In the illustrated embodiment, the communications component 818 includes a first cellular transceiver 820 that operates in one mode (e.g., GSM), and an $N^{th}$ cellular transceiver 822 operates in a different mode (e.g., UMTS). While only two cellular transceivers 820, 822 are illustrated, it should be appreciated that more than two transceivers can be included in the communications component 818.

The illustrated communications component 818 also includes an alternative communications transceiver 824 for use by other communications technologies including WI-FI, WIMAX, BLUETOOTH, infrared, infrared data association ("IRDA"), near field communications ("NFC"), other RF, combinations thereof, and the like. In some embodiments, the communications component 818 also facilitates reception from terrestrial radio networks, digital satellite radio networks, internet-based radio service networks, combinations thereof, and the like.

The communications component 818 processes data from a network such as an internet, an intranet, a home broadband network, a WI-FI hotspot, and the like, via an internet service provider ("ISP"), digital subscriber line ("DSL") provider, or broadband provider.

Audio capabilities for the mobile device 800 may be provided by an audio I/O component 826 that includes a speaker for the output of audio signals and a microphone to collect audio signals.

The illustrated mobile device 800 also includes a USIM system 828 that includes a SIM slot interface 830 for accommodating a USIM card. In some embodiments, the USIM system 828 is configured to accept insertion of other SIM cards for access to other network types such as GSM. In other embodiments, the USIM system 828 is configured to accept multiple SIM cards. In still other embodiments, the USIM system 828 is configured to accept a universal integrated circuit card ("UICC") with one or more SIM applications stored thereupon.

The mobile device 800 may also include an image capture and processing system 832 ("image system"). Photos may be obtained via an associated image capture subsystem of the image system 832, for example, a camera. The mobile device 800 may also include a video system 834 for capturing, processing, recording, and/or modifying video content. Photos and videos obtained using the image system 832 and the video system 834, respectively, may be added as message content to an MMS message and sent to another mobile device.

The illustrated mobile device 800 also includes a location component 836 for sending and/or receiving signals such as GPS data, assisted-GPS data, WI-FI/WIMAX and/or cellular network triangulation data, combinations thereof, and the like, for determining a location of the mobile device 800. The location component 836 may communicate with the communications component 818 to retrieve triangulation data for determining a location of the mobile device 800. In some embodiments, the location component 836 interfaces with cellular network nodes, telephone lines, satellites, location transmitters and/or beacons, wireless network transmitters and receivers, combinations thereof, and the like. In some embodiments, the location component 836 includes one or more sensors such as a compass, an accelerometer, and/or a gyroscope to determine the orientation of the mobile device 800. Using the location component 836, the mobile device 800 can generate and/or receive data to identify its location, or transmit data used by other devices to determine the location of the mobile device 800. The location component 836 may include multiple components for determining the location and/or orientation of the mobile device 800.

The illustrated mobile device 800 also includes a power source 838, such as one or more batteries and/or other power subsystem (AC or DC). The power source 838 may interface with an external power system or charging equipment via a power I/O component 840.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 800 or other devices or computers described herein, such as the computer system described below with reference to FIG. 9. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 800 in order to store and execute the software components presented herein. It is also contemplated that the mobile device 800 may not include all of the components shown in FIG. 8, may include other components that are not explicitly shown in FIG. 8, or may utilize an architecture completely different than that shown in FIG. 8.

Based on the foregoing, it should be appreciated that concepts and technologies for a predictive messaging service for active voice calls have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

I claim:

1. A method comprising:
   receiving, at a predictive messaging system comprising a processor, incoming audio associated with a voice conversation that occurs during an active voice call between a first user and a second user;
   converting, by the predictive messaging system, the incoming audio associated with the voice conversation into text;
   analyzing, by the predictive messaging system, the text to predict a message that the first user participating in the active voice call is expected to send as a result of information exchanged during the voice conversation, wherein analyzing the text comprises
      comparing the text to a rule, the rule defining a pattern of data and a destination associated with the pattern of data, the pattern of data comprising a plurality of keywords, and
      determining whether at least a portion of the text matches at least a portion of the pattern of data;
   in response to determining that the at least a portion of the text matches the at least a portion of the pattern of data, creating, by the predictive messaging system, the message, the message associated with at least a portion of the plurality of keywords of the at least a portion of the pattern of data; and sending, by the predictive messaging system, the message to a network element for delivery to the destination defined by the rule, wherein the destination defined by the rule is not associated with the first user and the second user.

2. The method of claim 1, wherein sending the message to the network element comprises sending the message to:
a short message service center;
an email server;
an instant messaging server; or
a social networking server.

3. The method of claim 1, further comprising:
identifying a lack of inflection associated with a word of the incoming audio, wherein the text comprises the word; and
ignoring, when creating the message, a keyword of the plurality of keywords determined to match the word based on the lack of inflection associated with the word.

4. The method of claim 1, further comprising storing the text.

5. The method of claim 4, further comprising discarding, after the text is stored, the text in response to determining that the at least a portion of the text does not match the at least a portion of the pattern of data.

6. The method of claim 1, wherein the pattern of data is contained within a user profile associated with the first user.

7. The method of claim 1, wherein the rule further defines an instruction to obtain address information of the first user participating in the active voice call and to include the address information in the message.

8. The method of claim 1, wherein the pattern of data comprises a modification that incorporates user behavior identified by an analysis of a previous communication associated with the first user.

9. The method of claim 1, wherein sending the message to the network element comprises:
sending the message during the active voice call; or
sending the message after the active voice call.

10. A predictive messaging system comprising:
a processor; and
a memory that stores computer-executable instructions that, when executed by the processor, cause the processor to perform operations comprising
receiving incoming audio associated with a voice conversation that occurs during an active voice call between a first user and a second user,
converting the incoming audio associated with the voice conversation into text,
analyzing the text to predict a message that the first user participating in the active voice call is expected to send as a result of information exchanged during the voice conversation, wherein analyzing the text comprises
comparing the text to a rule, the rule defining a pattern of data and a destination associated with the pattern of data, the pattern of data comprising a plurality of keywords, and
determining whether at least a portion of the text matches at least a portion of the pattern of data,
in response to determining that the at least a portion of the text matches the at least a portion of the pattern of data, creating the message, the message associated with at least a portion of the plurality of keywords of the at least a portion of the pattern of data, and
sending the message to a network element for delivery to the destination defined by the rule, wherein the destination defined by the rule is not associated with the first user and the second user.

11. The predictive messaging system of claim 10, wherein the operations further comprise:
identifying a lack of inflection associated with a word of the incoming audio, wherein the text comprises the word; and
ignoring, when creating the message, a keyword of the plurality of keywords determined to match the word based on the lack of inflection associated with the word.

12. The predictive messaging system of claim 10, wherein the operations further comprise:
storing the text; and
discarding, after storing the text, the text in response to determining that the at least a portion of the text does not match the at least a portion of the pattern of data.

13. The predictive messaging system of claim 10, wherein the pattern of data is contained within a user profile associated with the first user.

14. The predictive messaging system of claim 10, wherein the rule further defines an instruction to obtain address information of the first user participating in the active voice call and to include the address information in the message.

15. The predictive messaging system of claim 10, wherein the pattern of data comprises a modification that incorporates user behavior identified by an analysis of a previous communication associated with the first user.

16. The predictive messaging system of claim 10, wherein sending the message to the network element comprises:
sending the message during the active voice call; or
sending the message after the active voice call.

17. A computer-readable storage medium that stores computer-executable instructions that, when executed by a processor, cause the processor to perform operations comprising:
receiving incoming audio associated with a voice conversation that occurs during an active voice call between a first user and a second user;
converting the incoming audio associated with the voice conversation into text;
analyzing the text to predict a message that the first user participating in the active voice call is expected to send as a result of information exchanged during the voice conversation, wherein analyzing the text comprises
comparing the text to a rule, the rule defining a pattern of data and a destination associated with the pattern of data, the pattern of data comprising a plurality of keywords, and
determining whether at least a portion of the text matches at least a portion of the pattern of data;
in response to determining that the at least a portion of the text matches the at least a portion of the pattern of data, creating the message, the message associated with at least a portion of the plurality of keywords of the at least a portion of the pattern of data; and
sending the message to a network element for delivery to the destination defined by the rule, wherein the destination defined by the rule is not associated with the first user and the second user.

18. The computer-readable storage medium of claim 17, wherein the operations further comprise:
identifying a lack of inflection associated with a word of the incoming audio, wherein the text comprises the word; and ignoring, when creating the message, a keyword of the plurality of keywords determined to match the word based on the lack of inflection associated with the word.

19. The computer-readable storage medium of claim 17, wherein the operations further comprise:

storing the text; and discarding, after storing the text, the text in response to determining that the at least a portion of the text does not match the at least a portion of the pattern of data.

20. The computer-readable storage medium of claim 17, wherein the pattern of data is contained within a user profile.

* * * * *